United States Patent [19]

Messing

[11] 4,059,718
[45] Nov. 22, 1977

[54] COMPOSITE OF METAL AND INSULATING MATERIAL WITH SETBACK WHICH EXPOSES BATTERY TERMINAL

[75] Inventor: Terry Glen Messing, Verona, Wis.

[73] Assignee: ESB Incorporated, Philadelphia, Pa.

[21] Appl. No.: 735,828

[22] Filed: Oct. 26, 1976

[51] Int. Cl.² ................................ H01M 2/02
[52] U.S. Cl. ............................ 429/162; 429/163; 429/178
[58] Field of Search ............ 429/162, 163, 149, 152, 429/156, 157, 158, 160, 174, 178

[56] References Cited

U.S. PATENT DOCUMENTS

| 2,870,235 | 1/1959 | Soltis .............................. 429/162 X |
| 3,480,481 | 11/1969 | Gauthier et al. ................ 429/174 X |
| 3,708,340 | 1/1973 | Tamminen ...................... 429/157 X |
| 3,741,813 | 6/1973 | Bengum et al. ................. 429/162 X |
| 3,967,292 | 6/1976 | Delahunt ............................ 354/174 |

Primary Examiner—Anthony Skapars
Attorney, Agent, or Firm—Raymond L. Balfour

[57] ABSTRACT

A composite of metal and an insulating material overlays a battery terminal, with openings in the composite exposing the terminal. A portion of the insulating material extends inside the opening in the metal layer, causing the edge of the metal to be set back from the edge of the insulator. Preferably the metal is aluminum foil.

8 Claims, 7 Drawing Figures

COMPOSITE OF METAL AND INSULATING MATERIAL WITH SETBACK WHICH EXPOSES BATTERY TERMINAL

BACKGROUND OF THE INVENTION

Composites or laminations of metal and electrically conductive plastics have been used in battery constructions for their superior moisture retention characteristics. See U.S. Pat. No. 3,741,814, where the laminate also functions as the terminal for the battery.

This invention is concerned with a composite of metal and an insulating material, with the composite being used to overlay a battery and retain moisture in the battery. Because the insulating material is situated between the metal layer of the composite and a terminal of the battery, openings must be provided in both the metal and the insulating layers to expose the terminal.

It is desirable to have a portion of the insulating material extend inside the opening of the metal layer so that the edge of the metal is set back from the edge of the insulating material, thereby making unlikely the possibility of electrical contact between the metal layer and the battery terminal.

SUMMARY OF THE INVENTION

The composite of metal and an insulating material overlays the battery terminal, with openings in the composite exposing the terminal. A portion of the insulating material extends inside the opening in the metal layer, causing the edge of the metal to be set back from the edge of the insulator.

Preferably the metal in the composite is aluminum foil.

A method of producing the composite is disclosed in which the setback and the extension of the insulator are the result of pulling on the metal until the bond between the metal and insulator is broken, causing the insulator to be stretched in the process. To achieve this result the bond between the metal and the insulating material must be of such a strength, relative to the tensile strength of the insulating material, that the bond can be broken over the area of the setback without breaking the insulating material.

Figure 1:
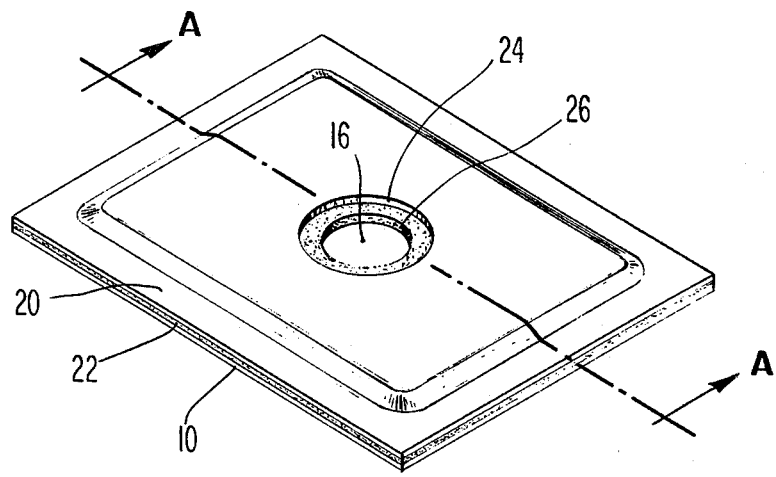
FIG. 1 is a pictorial view of the battery and metal-insulator composite of this invention.

Thicknesses of the materials have been exaggerated in the drawings for purposes of illustration.

DESCRIPTION OF THE PREFERRED EMBODIMENTS

FIG. 1 shows a dry cell battery in combination with the composite of metal and insulating material of this invention.

Figure 2:
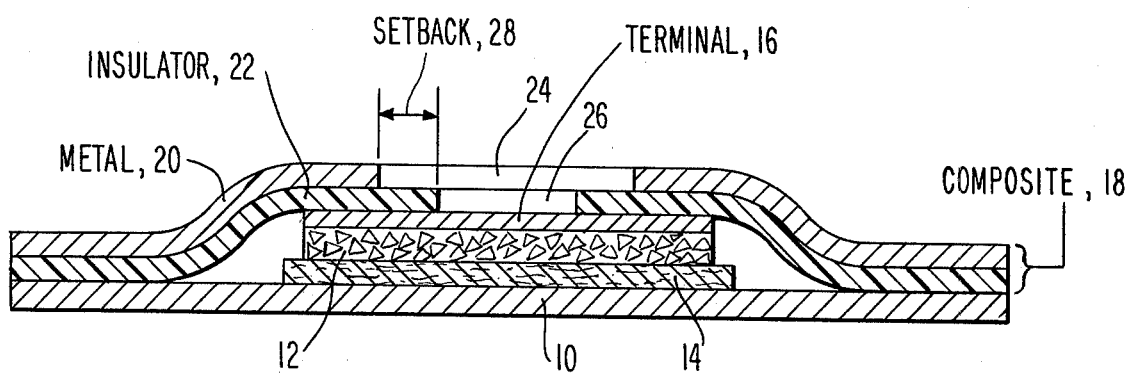
FIG. 2 is a cross-section taken along line A—A of FIG. 1.

Referring to FIG. 2 where the combination of FIG. 1 is shown in cross-section, the battery comprises a sheet metal anode 10 made from a material such as zinc, a cathode 12, and an electrolyte-containing layer 14 between the anode and cathode. A terminal 16 is situated in contact with the cathode 12 opposite the electrolyte-containing layer 14.

A composite 18 of metal 20 and an electrically insulating material 22 overlays the battery terminal 16, with the insulator 22 being situated between the metal 20 and the terminal 16. The composite has openings in both the metal and the insulating material (24 and 26, respectively) which expose the terminal and permit electrical contact to be made with the terminal.

As shown in FIG. 2, a portion of the insulating material 22 extends inside the opening 24 of the metal layer so that the edge of the metal is set back from the edge of the insulating material. This setback 28 makes unlikely the possibility of electrical contact between the metal layer 20 and the battery terminal 16.

The composite may be produced by a variety of methods. For example, separate layers of metal and insulating material each having a prepunched opening of appropriate size may be placed in proper registry and bonded or adhered together by heat, separate layers of adhesive, or other means. According to another method, a layer of insulating material having a prepunched opening may be coated with a layer of metal by a flame spray, vacuum deposition, electrodeposition, or other techniques, with the edge of the metal deposit being set back from the edge of the opening in the insulating material as shown in the drawings.

Figure 3:
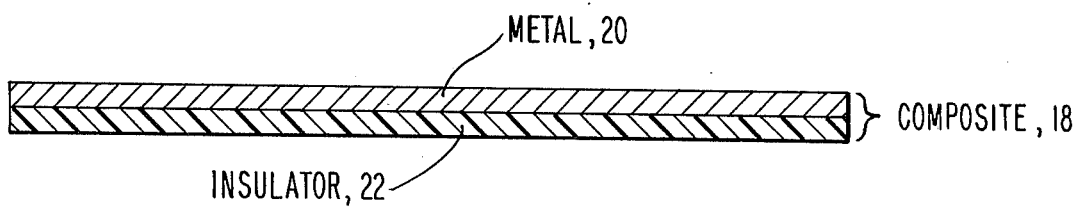
FIG. 3 is a cross-section of a composite of metal and insulating material.
Figure 4:
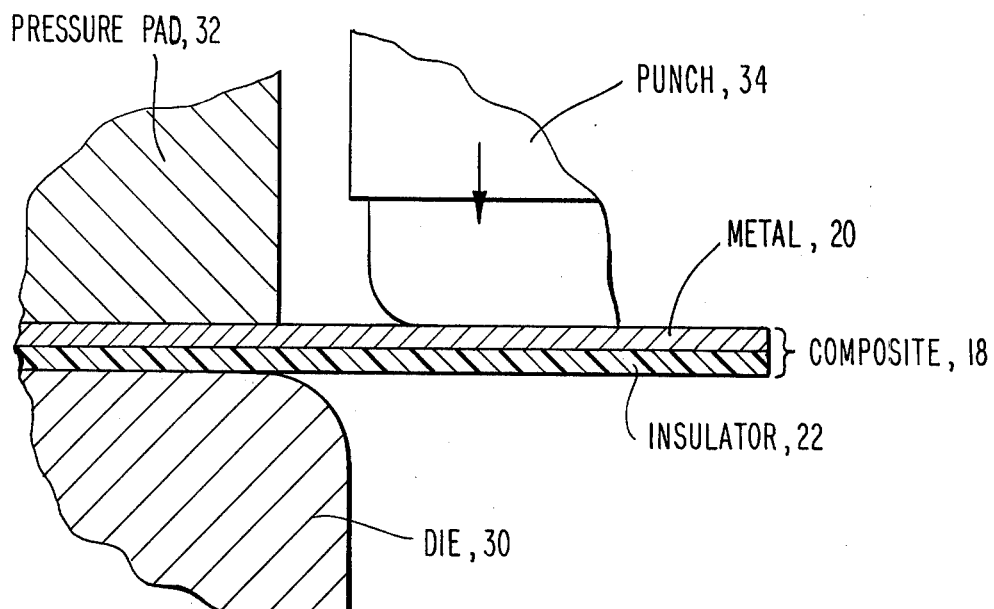
FIG. 4 is a cross-section showing the composite of FIG. 3 held between a die and pressure pad, with a punch positioned to act against the composite.
Figure 5:
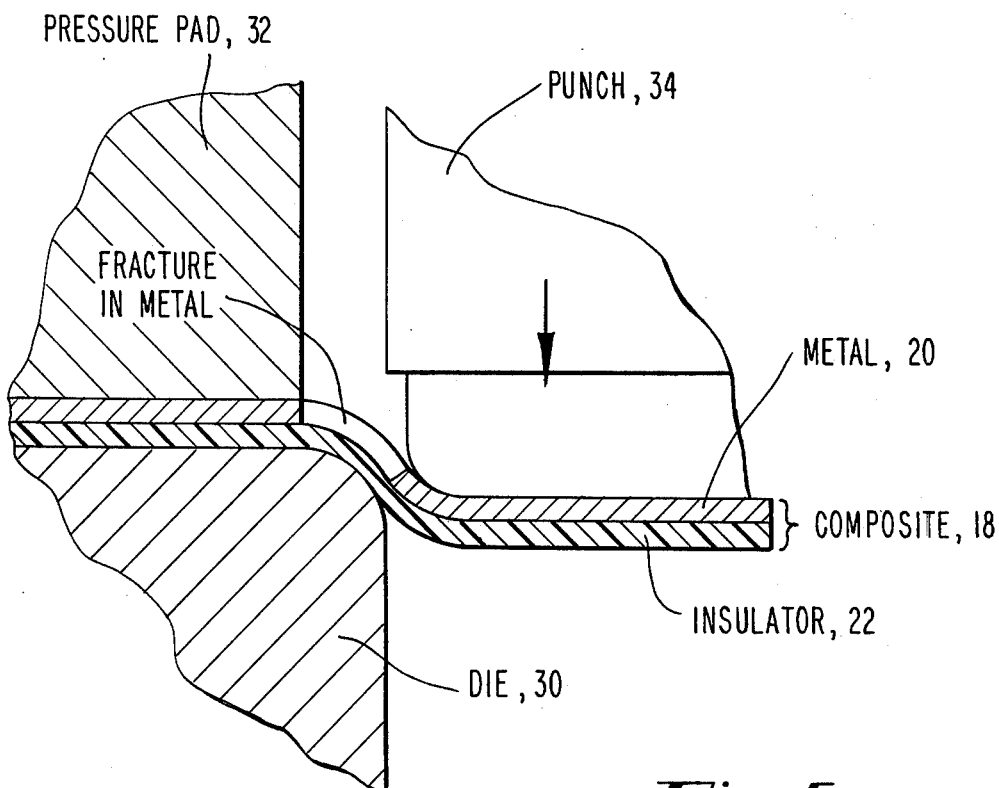
FIG. 5 shows the materials and apparatus of FIG. 4 at a later time, after the punch has acted against the composite to fracture the metal and stretch the insulating material.
Figure 6:
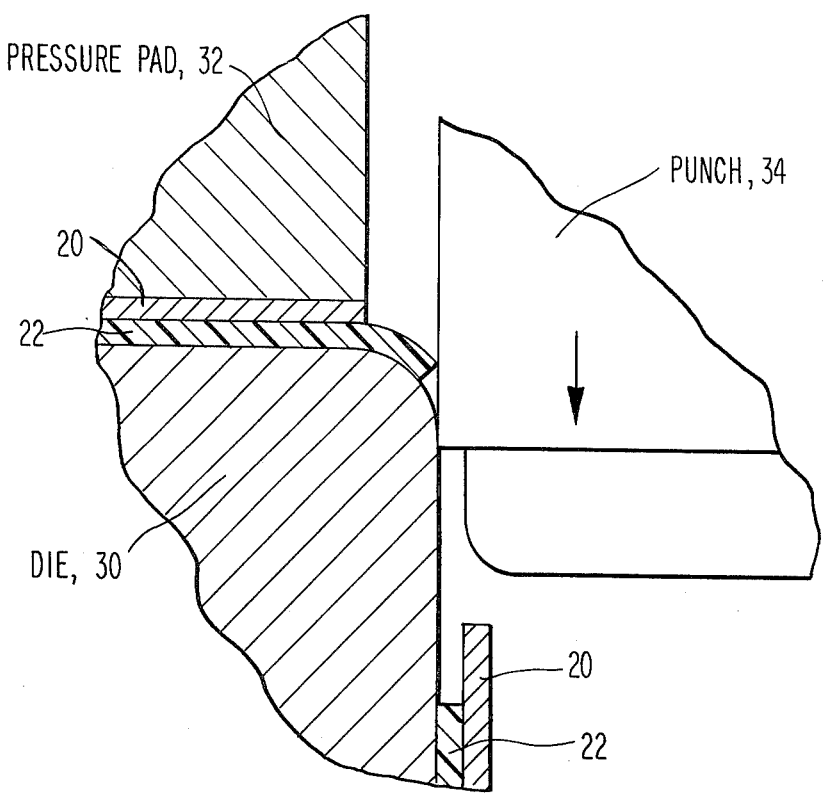
FIG. 6 shows the materials and apparatus of FIGS. 4 and 5 at a still later time, after the punch has severed the insulating material.

FIGS. 3 through 6 illustrate another process by which the openings in the composite may be produced. A dry heat laminated composite 18, shown by itself in FIG. 3, is placed in a die 30 and securely held in place by a pressure pad 32, as shown in FIG. 4. A punch 34 is positioned to act against and force the composite 18 in the direction of the die cavity. As the punch moves downward as shown in FIG. 5, the composite is stretched until a fracture develops in the metal, after which the insulator is sheared off or pinch trimmed by the punch. Using a circular punch and a die having a circular cavity, the result will be a composite with circular openings after the circular punched-out piece has been removed. The remaining composite will have an extension of the insulator projecting beyond the edge of the metal, which extension is the desired setback 28 when the composite is later overlaid on top of the battery terminal. As required by the process shown in FIGS. 3 through 6, the setback 28 and the extension of the insulating material 22 are the result of pulling on the metal until the bond between the metal and insulator is broken; to achieve this result the bond between the metal and the insulating material must be of such a strength, relative to the tensile strength of the insulating material, that the bond can be broken over the area of the setback without breaking the insulating material.

Figure 7:
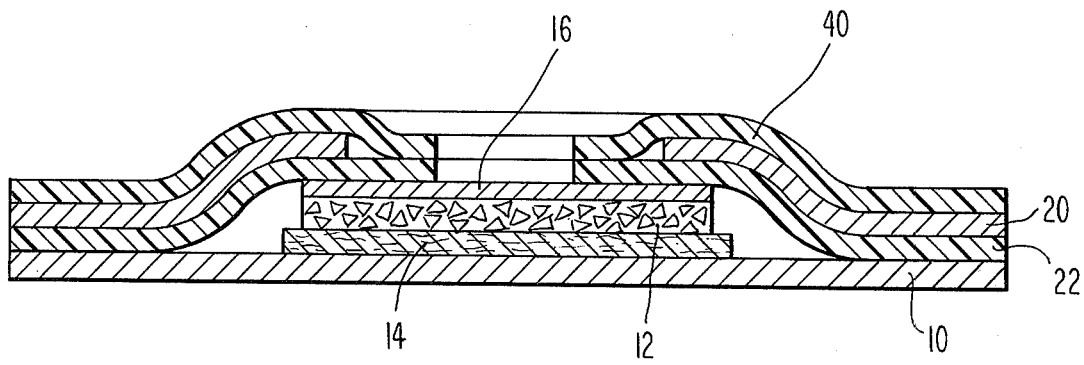
FIG. 7 is similar to FIG. 2, except that is shows a second layer of insulating material situated on the outer side of the metal. The second insulator leaves the battery terminal exposed but the metal insulated.

In case it is desired to insulate the metal 20 not only from the terminal 16 but also from conductors external to the battery and composite combination, a second layer of insulating material 40 may be added to the combination on the other side of the face of the metal 20 from the first insulating layer 22. Such a construction is shown in FIG. 7. This second insulating layer 40 extends inside the opening in the metal where it may if desired be sealed to the first insulator 22 or, alternatively or additionally, to the battery terminal 16. The second insulator is provided with an appropriate opening to expose and permit contact with the battery terminal. To produce the result shown in FIG. 7 a three member composite consisting of first insulator 22, metal layer 20, and second insulator 40 can be subjected to the punch and die process previously described and illustrated in FIGS. 3 through 6, after which the two insulating materials may be sealed together. Alternatively, a separate layer of insulating material 40 may be added to the composite 18 after the latter has been punched as described above.

The metal 20 in the required composite may be any desired metal, although aluminum is preferred. Aluminum is commercially available in very thin foils, is relatively inexpensive, and has physical properties which lend themselves satisfactorily to this invention. Aluminum foil as thin as 0.00025 inches may advantageously be used.

A variety of insulating materials 22 may be used in the composite, along with the metal 20. Illustrative examples include plastic films such as polyethylene, vinyl, polypropylene, and others. The invention is not to be considered to be limited to specific insulating materials.

The battery used in combination with the composite is not limited to any particular electrochemical systems or electrode and electrolyte materials, properties, or configurations. The battery may be either multicell or a single cell. Although the exposed terminal shown in FIG. 2 is at the positive end of the battery and is separate from the positive, the negative terminal may alternatively or additionally be covered with the composite and exposed through an opening in the composite; the negative terminal may also be the negative electrode, as it is in FIG. 2. If the two terminals are exposed at opposite ends of the battery as shown in FIG. 2, the composite may be wrapped around the edge of the battery and have openings at both ends of the battery to expose both terminals; alternatively two pieces of the composite may be used, one with each terminal. If the battery is constructed so as to have both terminals exposed at the same end or face of the battery, as shown for example in U.S. Pat. Nos. 3,734,780 and 3,967,292, the composite may have two sets of openings of the type described above and shown in the drawings in order to expose both terminals. In summary, the battery shown in FIGS. 1, 2, and 7 is illustrative only, and its features are not to be taken as limitations of the present invention.

Finally, while the discussion has been in terms of the composite "overlaying" the battery terminal, this is not to be construed as requiring either direct physical contact or an overlap between the composite and the terminal; a terminal small enough to be confined within the openings of the composite, and not making direct physical contact with the composite, is "overlaid" by the composite if the openings in the composite expose the terminal.

I claim:
1. The combination of
   a. a battery having a terminal;
   b. a composite of metal and an insulating material overlaying the battery terminal and having openings in both the metal and insulating material which expose the terminal, the insulating material being situated between the metal and the terminal, the composite being further described as having a portion of the insulating material extend inside the opening of the metal layer so that edge of the metal is set back from the edge of the insulating material.
2. The combination of claim 1 in which the metal is aluminum.
3. The combination of claim 1 in which there is a second layer of insulating material, the second layer being situated on the other face of the metal from the first layer of insulating material, which second layer has an opening which leaves the battery terminal exposed.
4. The combination of claim 3 in which the second layer of insulating material extends inside the opening in the metal.
5. The combination of claim 3 in which the metal is aluminum.
6. The combination of claim 4 in which the metal is aluminum.
7. The combination of claim 1 in which there is a bond between the metal and the insulating material and in which the bond is of such a strength, relative to the tensile strength of the insulating material, that the bond can be broken over the area of the setback without breaking the insulating material.
8. The combination of claim 2 in which there is a bond between the metal and the insulating material and in which the bond is of such a strength, relative to the tensile strength of the insulating material, that the bond can be broken over the area of the setback without breaking the insulating material.

* * * * *